United States Patent [19]
Kingsley et al.

[11] Patent Number: 5,340,988
[45] Date of Patent: Aug. 23, 1994

[54] HIGH RESOLUTION RADIATION IMAGING SYSTEM

[75] Inventors: Jack D. Kingsley; Chukka Srinivas, both of Schenectady, N.Y.

[73] Assignee: General Electric Company, Schenectady, N.Y.

[21] Appl. No.: 43,116

[22] Filed: Apr. 5, 1993

[51] Int. Cl.$^5$ .............................................. G01T 1/24
[52] U.S. Cl. ..................... 250/370.09; 250/370.08; 250/370.11
[58] Field of Search ................ 250/370.11, 370.09, 250/370.08, 334, 332; 358/213.28

[56] References Cited

U.S. PATENT DOCUMENTS 5,182,652  1/1993  Stephenson, III ................ 358/296

FOREIGN PATENT DOCUMENTS 58-56581  4/1983  Japan ............................ 358/213.28
4-47288   2/1992  Japan ............................ 250/370.08

OTHER PUBLICATIONS

Grant proposal submitted to Division of Research Grants, National Institute of Health, Bethesda, Md. on Jun. 1, 1992, and a supplemental submission made to NIH on or about Aug. 1, 1992.

Imaging Processes and Materials, Neblette's 8th edition, edited by John Sturge et al., Van Nostrand Reinhold, New York, pp. 311-318.

Primary Examiner—Constantine Hannaher
Attorney, Agent, or Firm—Donald S. Ingraham; Marvin Snyder

[57] ABSTRACT

A radiation imaging system includes an image detector assembly coupled to an image processor. The image detector assembly includes a photosensor pixel array which is disposed in a plurality of sequential imaging positions pursuant to a predetermined imaging cycle. The image processor stores the respective image data signals from each photosensor pixel in the array from each respective imaging position in a given imaging cycle in an unfiltered interleaved data set, and then apply the unfiltered data to a deblurring filter to generate a non-aliased high resolution data set appropriate for driving a display and analysis module.

39 Claims, 2 Drawing Sheets

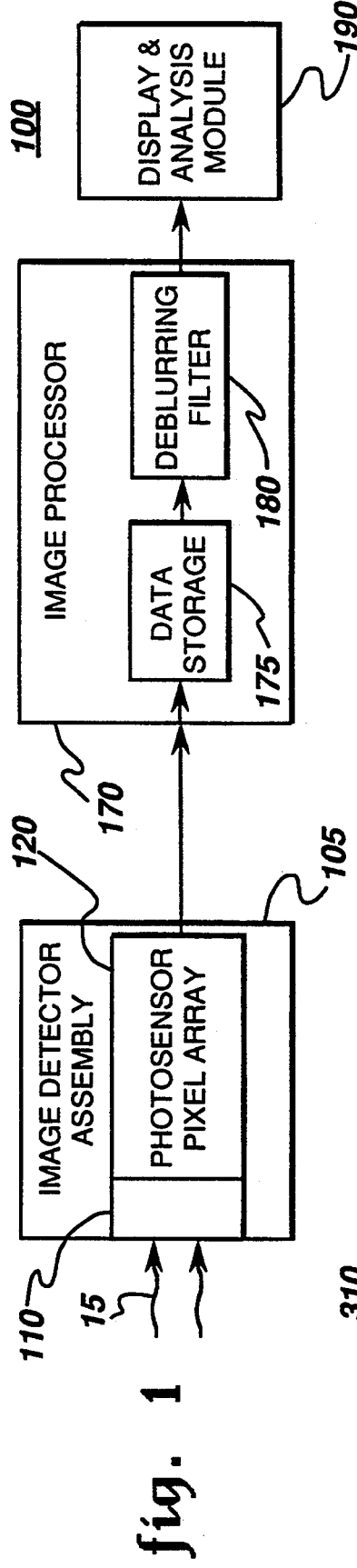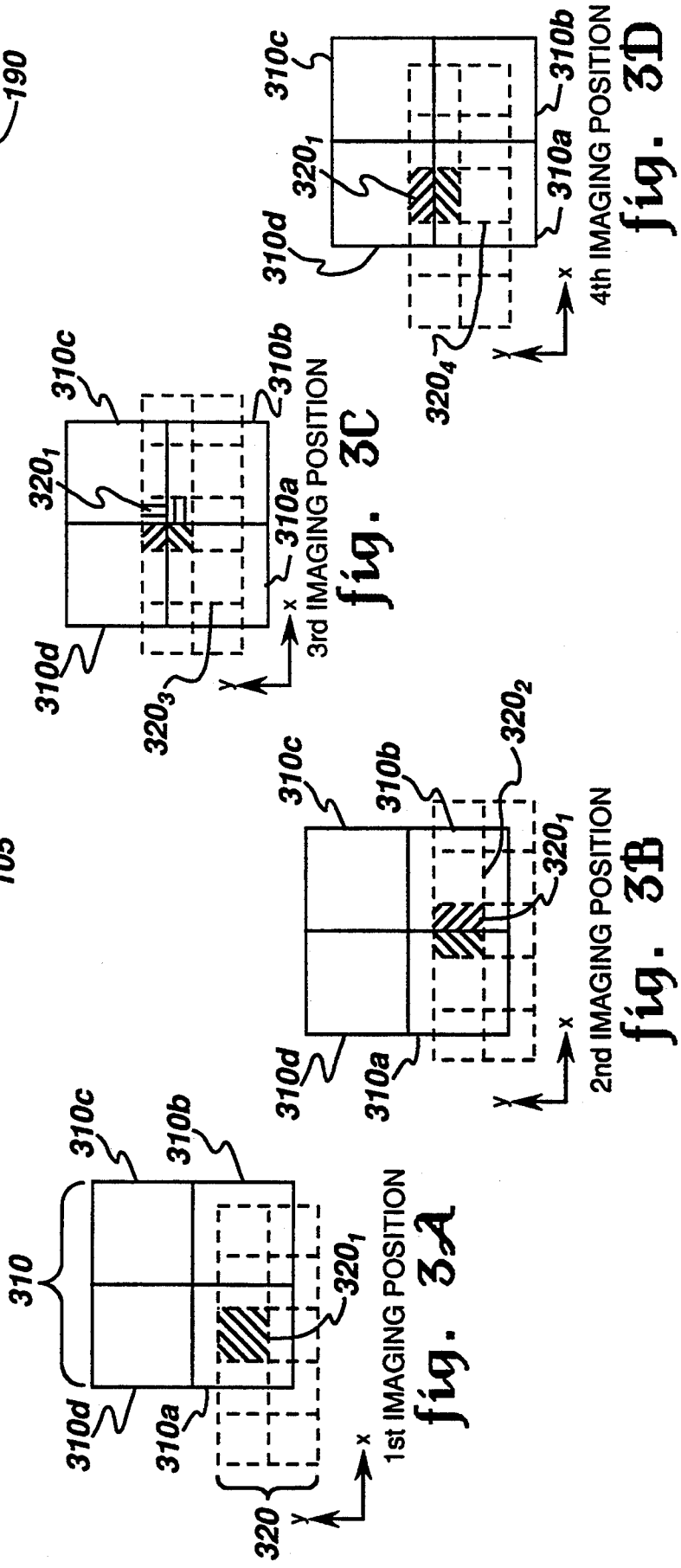

HIGH RESOLUTION RADIATION IMAGING SYSTEM

BACKGROUND OF THE INVENTION

This invention relates generally to imaging of radiation such as x-rays and the like, and more particularly relates to digital imaging systems adapted to image objects having spatial frequency components above the imaging system's Nyquist frequency.

Solid state radiation imagers are used for imaging non-optical radiation such as x-rays and high energy nuclear radiation such as gamma rays. Incident radiation is typically detected in solid state imagers through a process in which the incident radiation is absorbed in a scintillator, resulting in the generation of optical photons. Photosensors, such as photodiodes or the like, disposed in an array adjacent to the scintillator detect the optical photons. The location in the array of the photosensor detecting the light and the intensity of the signal generated by the photosensor are processed for display and analysis of the incident radiation. Alternatively, the incident radiation may be absorbed directly in photosensitive elements which convert the energy of the incident radiation into mobile charge particles.

One typical use of solid state radiation imaging systems is medical imaging, in which radiation passing through or emanating from a patient's body is used to visualize objects or materials within the body. Medical imaging devices preferably exhibit high spatial frequency response, short image acquisition time, and high detective quantum efficiency (DQE, a measure of how efficiently an image recorder uses the radiation to which it is exposed). Efforts to improve spatial resolution (that is spatial frequency response, described by an imaging system's modulation transfer function and corresponding to the preservation of the object contrast of an imaged object in the output image) typically include manufacturing photosensor pixels of smaller sizes. The pixel pitch effectively determines the smallest resolvable dimension because a point source of light incident on a pixel is integrated over the area of the pixel. Imager arrays of smaller size pixels, however, require more technically demanding and costly manufacturing methods.

In the film scanning art, a number of imaging methods for solid state imagers have been developed. For example, increased spatial resolution has been obtained through the use of a so-called tiled area scanner, in which the scanned area is divided into slightly overlapping areas, with the imager having only sufficient pixels to cover one area at a time. The images developed by one imager sequentially passing over the areas or by multiple imagers imaging different regions can be combined to generate a complete image of the object. Problems with this approach include a device that is relatively temporally slow (low temporal resolution) and subject to image degradation from seaming, that is the mismatch of signals generated in the overlap region of two adjoining regions imaged by the moving imager. Another method used with solid state imagers is called fine-scan sampling, in which an imager with non-contiguous pixels is placed in a particular position for a time period to allow the photosites to integrate a portion of the film to be imaged, then the imager is shifted to a second position and a new integration cycle is commenced in which another set of pixels is imaged. Disadvantages of the fine scan method include the additional digital image processing required and the sensitivity of the display to artifacts introduced in the processing electronics. See generally "Image Scanning and Digitization" by J. Milch, Ch. 10, pp. 314–318, in *Imaging Processes and Materials* (Neblette's Eight Edition), ed. J. Sturge, V. Walworth, and A. Shepp (1989), which is incorporated herein by reference.

It is therefore an object of this invention to provide a high resolution radiation imaging system having a non-aliased spatial frequency response at frequencies greater than the imaging system's Nyquist frequency.

A further object of this invention is to provide a radiation imaging system providing high spatial resolution with deblurred images without requiring the need to increase irradiation of the object to be imaged.

A still further object of this invention is to provide a radiation imaging system that generates a high resolution image through oversampling.

SUMMARY OF THE INVENTION

In accordance with the present invention a radiation imaging system comprises a photosensor pixel array that is adapted to be disposed in a plurality of sequential imaging positions pursuant to a predetermined imaging cycle, and an image processor electrically coupled to receive image data signals generated by respective ones of the photosensor pixels in the array and adapted to store the image data signals generated during an imaging cycle as an unfiltered data set, the image processor further comprising a deblurring filter adapted to selectively filter the unfiltered data set to generate a fine resolution data set. A display and analysis module is typically coupled to the image processor to receive the high resolution data set signals and to drive an output fine resolution array having a higher number of pixel elements than the photosensor pixel array.

The sequential imaging positions are selected such that during one imaging cycle the aliasing errors are cancelled in the generation of the fine resolution data set. Typically the plurality of sequential imaging positions comprises four imaging positions, the positions being respectively disposed such that the distance between adjacent imaging positions along a selected axis of movement for the photosensor pixel array are such that, in each respective imaging position, each photosensor pixel in the imager is centered on only one the respective areas representing each pixel element in the output fine resolution array in each imaging position. Further, in an imaging cycle, the four imaging positions are disposed such that each area representing a pixel element in the output high resolution array is centered on a respective photosensor pixel in only one of the four imaging positions. Typically, the distance between adjacent imaging positions along the selected axis of movement is substantially one-half the pitch of the photosensor pixels.

A method of generating a high resolution image comprises the steps of: sequentially positioning an array of photosensor pixels in one of K respective imaging positions along a selected imaging path in accordance with a predetermined imaging cycle; storing image data generated by the photosensor pixels in each of the respective imaging positions during an imaging cycle as an unfiltered data set; and applying the unfiltered data set to a deblurring filter to form a high resolution data set. The respective imaging positions in an imaging cycle are disposed such that the unfiltered data set and the fine resolution data set generated therefrom are non-aliased.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

FIG. 1 is a block diagram of a radiation imaging system comprising the present invention.

FIGS. 3(A)–3(D) are illustrations showing the relative position of a portion of a photosensor pixel array with respect to a grid box representing a portion of the fine resolution array of an imaged object in each of four sequential imaging positions in an imaging cycle in accordance with this invention.

DETAILED DESCRIPTION OF THE INVENTION

Figure 2:
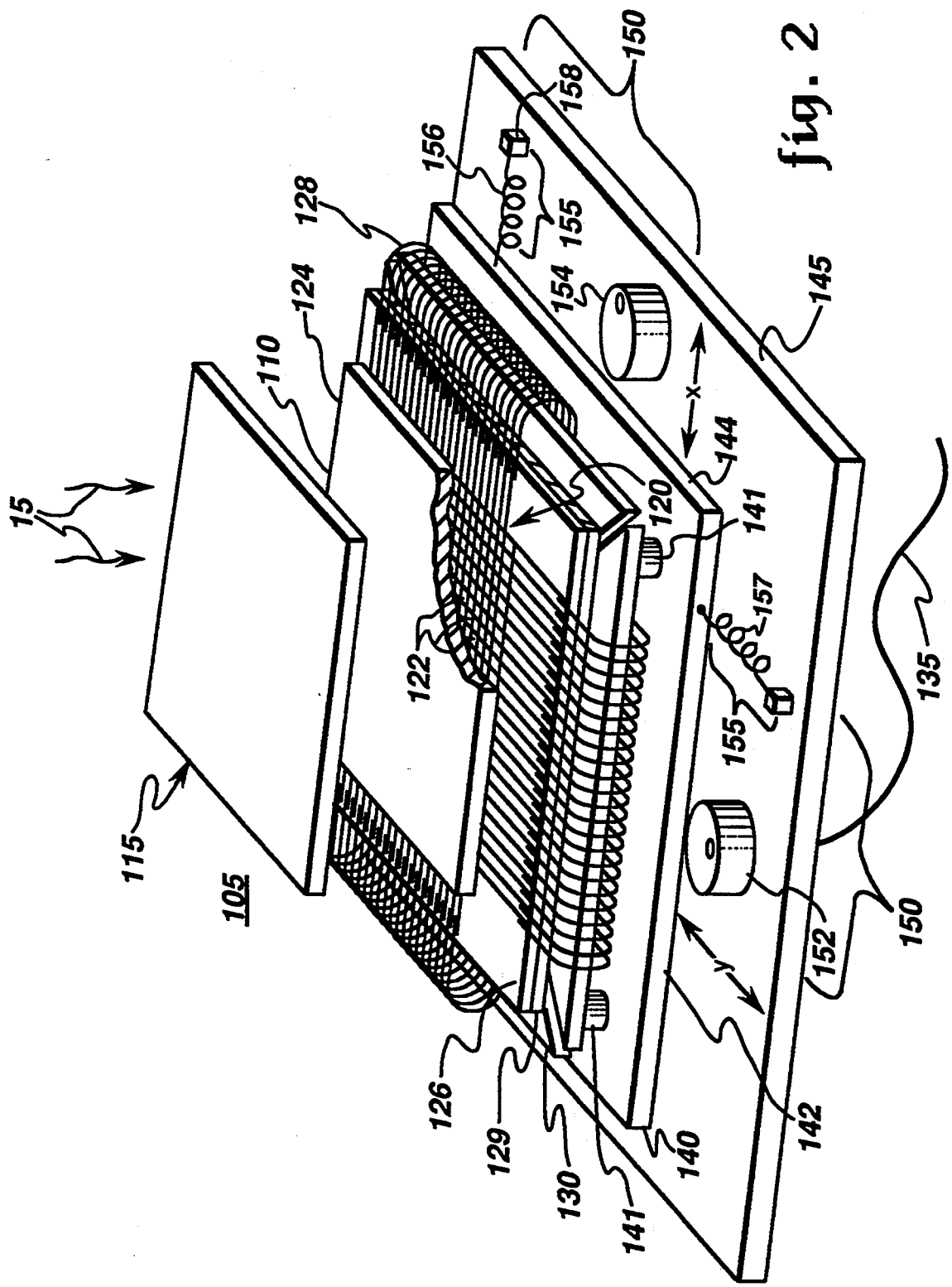
FIG. 2 is a perspective, partially cut-away, diagram of an image detector assembly of a radiation imaging system in accordance with the present invention.

In FIG. 1, a radiation imaging system 100 for detecting incident radiation is shown comprising an image detector assembly 105, an image processor 170, and a display and analysis module 190. Image detector assembly comprises a photosensor pixel array 120, which, in one embodiment, is optically coupled to a scintillator 110. Scintillator 110 is disposed to receive incident radiation rays 15, such as x-rays or the like. Optical photons generated in scintillator 110 in response to incident radiation 15 pass to photosensor pixel array 120 in which the light is detected and corresponding image data signals are generated by photosensors in the array. Image processor 170 comprises a data storage device 175 and a deblurring filter 180, and is electrically coupled to photosensor array 120 to receive and store in data storage device 175 the respective image data signals generated during oversampling the imaged object, that is the generation of image data signals from exposures to radiation in respective sequential imaging positions in the course of an imaging cycle. The unfiltered image data set stored during an imaging cycle of radiation imaging system 100 is applied to deblurring filter 180 to generate a non-aliased fine resolution data set having the desired increased spatial resolution and thence coupled to display and analysis module 190.

Photosensor array 120 comprises a plurality of photosensor pixels 122, such as photodiodes or the like (FIG. 2). The photosensors are arranged in rows and columns, typically in an N×M matrix arrangement, with each photosensor being connected to an address line and a scan line (not shown) to allow charge developed in each respective photosensor in response to incident light to be read. By way of example and not limitation, the pixel size of the photosensors in the N×M arrangement is typically about 100 μm per side, with about 80% to about 90% of the area of the pixel being active, that is responsive to absorption of incident optical photons. Particularly in medical imagers, it is desirable to provide a photosensor in which the active pixel area is a large portion of the photosensor as the greater area maximizes the fraction of x-rays which are imaged so that patient radiation dose is lessened while still generating images of acceptable quality.

Typically scintillator 110 is disposed adjacent to photosensor pixel array 120 such that optical photons generated in scintillator 110 predominantly pass into photosensor pixel array 120 in close proximity to the point where the incident radiation was absorbed. Scintillator 110 typically comprises a scintillator material having a relatively large absorption cross section for the type of incident radiation 15 used with the imaging system 100. For example, in x-ray imagers, scintillator materials such as cesium iodide, sodium iodide, or the like are commonly used. Further, a protective cover 115 is typically disposed over scintillator 110. In an alternative arrangement (not illustrated in FIG. 2), image detector assembly 105 comprises a photosensitive and radiation absorptive material, such as lead oxide (PbO), thallium bromide (TlBr), or the like, which both absorbs the incident radiation and generates mobile charge particles which can be used to detect and measure the incident radiation.

Photosensor pixel array 120 is disposed on a substrate 126 which comprises glass or the like. A plurality of contact fingers 124 are disposed on substrate 126 and are electrically coupled to respective scan and data lines (not shown) which comprise the address lines through which charge generated in each photosensor in response to incident radiation is read out. A plurality of electrical couplers 128 connect respective contact fingers 124 with a readout circuit board 130, which in turn is coupled to image processor 170 (not shown) via an output cable 135. Image detector 105 typically further comprises a radiation shield 129 disposed between substrate 126 and readout circuit board so that any incident radiation 15 not absorbed in scintillator 110 is absorbed prior to reaching the readout circuit board. Radiation shield 129 comprising a material having a relatively low transmission (e.g., $10^{-4}$) for the type of radiation used in the imaging system. For example, in an x-ray imager, radiation shield 129 typically comprises lead several millimeters thick.

In accordance with this invention, photosensor array 120 is disposed on a displacement platform 140 such that movement of platform 140 along a selected axis translates into corresponding motion of photosensor array 120. For purposes of illustration and not limitation, in FIG. 2 displacement platform 140 is shown being moveably disposed on an imager foundation 145, and the combined assemblage of photosensor array 120, substrate 126, radiation shield 129, and readout circuit board 130 is mounted to displacement platform 140 via support pegs 141 such that movement of displacement platform causes an equivalent displacement in direction and distance of photosensor array 120. Alternatively, image detector assembly 105 is adapted such that radiation shield 129 and readout circuit board 130 are not moved by displacement of platform 140, and electrical couplers 128 are flexible so as to allow motion of photosensor array 120 between respective imaging positions.

Further, in accordance with this invention image detector assembly 105 comprises a drive mechanism 150 coupled to displacement platform 140 to selectively move the displacement platform to respective imaging positions with respect to imager foundation 145. For example, drive mechanism 150 typically comprises a first drive cam 152 and a second drive cam 154, each of which is disposed on imager foundation 145 to contact a respective side surface 142, 144 of displacement platform 140. First and second drive cams 152, 154 each have an eccentric shape selected to cause a predetermined displacement of platform 140 along a respective selected axis as the cam rotates. For example, as illustrated in FIG. 2, rotation of drive cam 152 causes motion of displacement platform along the y axis and rotation of drive cam 154 causes motion along the x-axis.

Image detector assembly 105 further comprises a biasing means 155 for maintaining drive cam 152 in contact with displacement platform side surface 142 and drive cam 154 in contact with displacement platform 144. Biasing means 155 comprises, for example, a spring 157 extended between displacement platform side surface 142 and an anchor 159 (to keep drive cam 152 in contact with side surface 142) and a spring 156 extending between displacement platform side surface 144 and an anchor 158.

Drive mechanism 150 thus is adapted to cause displacement of photosensor army 120 a predetermined distance along either the x or y axis with respect to imager foundation 145. In the embodiment of the present invention illustrated in FIG. 2, combinations of the respective maximum and minimum displacements of drive cams 152 and 154 provide four distinct imaging positions in which photosensor array 120 may be displaced.

Image detector assembly is electrically coupled to image processor 170, which comprises a data storage device 175 and a deblurring filter 180. Data storage device 175 comprises a computer adapted to store and process digital information as described in greater detail below. Similarly, deblurring filter 180 comprises a digital data processing device adapted to apply Wiener filtering to image data signals generated in the image detector assembly 105 during an imaging cycle and that are stored in data storage device 175.

In accordance with the present invention, radiation imaging system 100 is adapted to generate high resolution output images through the use of multiple exposures at a known displacement between images that effectively extend the frequency response of the imaging system beyond the Nyquist frequency of the device. The Nyquist frequency for spatial resolution is determined by the pixel pitch (for 100 μm pixels, it is 5 line pairs (lp)/mm). For the purpose of the illustrating this invention, it will be assumed that the physical size of the photosensor pixel is 100 μm on a side, which size pixel is readily manufactured in imager arrays. For some medical imaging uses such as mammography, a spatial resolution of about 50 μm may be desired.

In accordance with the present invention radiation imaging system 100 is adapted to generate an output to drive display and analysis module 190 based upon oversampling, that is multiple images of the object acquired from positioning photosensor array 120 in a predetermined number of spatially separate imaging positions in accordance with a predetermined imaging cycle. After data from one imaging cycle has been acquired, the unfiltered data set is applied to deblurring filter 180 to generate a high resolution image for display and analysis. The next imaging cycle, in which the photosensor array is again positioned in the predetermined imaging positions, provides the next set of unfiltered data which is applied to the deblurring filter to generate the next high resolution image.

By way of illustration and not limitation, the present invention is described with respect to an imaging system having 100 μm per side photosensor pixels and having a desired 50 μm limiting spatial resolution. Pursuant to this invention, four distinct imaging positions are used, each displaced from an adjoining imaging position (as used herein, an "adjoining" imaging position refers to an imaging position that is closest to another imaging position as measured along an axis on which the photosensor array is displaced) by 50 μm. Different numbers and locations of imaging positions can be used in accordance with this invention provided they are selected to provide the unfiltered image data, described below, from which non-aliased high resolution data sets may be generated by deblurring filter 180.

FIGS. 3(A)–(D) illustrate the four-imaging position imaging cycle. In FIG. 3(A) four representative photosensor pixels 310 (individually identified as pixels 310a–310d) are illustrated outlined by solid lines. These representative photosensor pixels comprise a portion of photosensor pixel array 120, and typically additional photosensor pixels (not shown) are disposed adjacent to each of the sides of the illustrated pixels. Each photosensor pixel 310 corresponds to a pixel having sides of 100 μm (the active, or light absorbing, the area of each such pixel is typically between about 80% and 90% of the overall pixel size; for ease of illustration only the physical boundaries of a given pixel are shown). In FIGS. 3(A)–(D) an underlying imaged object grid 320 is illustrated in dashed lines, each grid box having dimensions of 50 μm by 50 μm, and represents the spatial extent of each pixel in the fine resolution army. This grid is an arbitrary division of areas of the scintilator and is only used to represent the desired 50 μm resolvable size of an object to be imaged. For purposes of describing the invention, one grid box, denoted $320_1$–$320_4$ are discussed below. One grid box, $320_1$, is cross-hatched and represents a particular object of the desired resolvable size of which an image will be generated.

In FIG. 3(A), representing the first imaging position of photosensor array 120 in a given imaging cycle, grid box $320_1$ is completely contained within the area covered by photosensor pixel 310a. Photosensor pixel 310a thus integrates essentially all of the optical photons emerging from the area of grid box $320_1$ and also receives optical photons from portions of grid boxes adjoining the sides of grid box $320_1$. The charge (or other electrical signal used to measure the output of the photosensor) developed from the exposure of photosensor pixel 310a to the optical photons emerging from scintillator 110 comprises the image data signal generated by the pixel; each photosensor pixel 310 in the array would similarly generate a respective image data signal corresponding to the number of optical photons detected during the exposure period in the first imaging position. The image data signals generated by each photosensor pixel are coupled to image processor 170, in which each signal is respectively stored in data storage device 175.

FIG. 3(B) represents the same portions of object grid 320 and pixel array 310 following the micro-displacement of photosensor pixel array to the second imaging position. As illustrated in this figure, the second imaging is 50 μm to the left along the x-axis. In the second imaging position, one-half the area of grid box $320_1$ is covered by a portion of photosensor pixel 310a and one-half the area is covered by pixel 310b. Typically, it is accurate to assume that about one-half of all of the optical photons emerging from the area of grid box $320_1$ are detected in photosensor pixel 310a and one-half are detected in photosensor pixel 310b. In this second imaging position, each photosensor pixel generates an image data signal which is read by the readout circuit and coupled to image processor 170 to be interleaved and stored with the image data signals generated in the first imaging position. In addition, in the second imaging position photosensor army 320 has been displaced such that grid box 320₂ is centered within the boundaries of photosensor pixel 310a.

As used herein, "interleaved" refers to storing the image data signals from respective photosensor pixels in a manner that corresponds with the portions of imaged object grid 320 that is covered by a respective photosensor pixel. For example, each photosensor pixel is disposed over and images a different portion of imaged object grid in each different imaging position. Necessarily, portions of imaged object grid are imaged by multiple photosensor pixels as the photosensor pixel array is moved to sequential imaging positions. In accordance with this invention, the image data signals from respective photosensor pixels is interleaved so that the unfiltered data set comprises image data signals arranged in manner that corresponds to the relative position of the area imaged on the imaged object grid. In this way, the unfiltered data set provides the data from which a high resolution array that corresponds to the imaged object army can be driven; the high resolution array has a greater number of pixels that are capable of being driven by unique data signals than the photosensor pixel array.

FIG. 3(C) represents the relative positions of photosensor pixels 310 and imaged object grid 320 in the third imaging position. In the third imaging position the photosensor pixel array has been displaced by 50 μm downward along the y-axis from the second imaging position. In this position, grid box 320₁ is covered by portions of photosensor pixels 310a–310d, with the respective quarter-portions of grid box 320₁ covered by the different pixels being shown in different cross hatching. Further, in this third imaging position, photosensor pixel 310a now completely covers grid box 320₃, which is centered within the boundaries of that photosensor pixel. After exposure to radiation in this position, the charge developed in the respective pixels is again read and the image data signals from each respective photosensor pixel is interleaved with data collected from the exposures in the first and second imaging position and stored in image processor 170.

The relative positions of the underlying imaged object grid and the pixel array in the fourth imaging position is illustrated in FIG. 3(D). The fourth imaging position reflects displacement of the photosensor array from the third imaging position by 50 μm to the right along the x-axis. In this position, grid box 320₁ is covered by portions of photosensor pixels 310d and 310a. Photosensor pixel 310a in the fourth imaging position has been displace so as to be centered over a fourth grid box, 320₄. Thus, in each imaging position, one photosensor pixel completely covers only one grid box, and each grid box is completely covered by one photosensor pixel in at least one of the imaging positions. As with the previous imaging positions, after the object to be imaged has been exposed to radiation and a sampling time has elapsed to collect optical photons from the scintillator, the respective pixels are read and the respective image data signals from each pixel are stored in the image processor.

After image data signals from the fourth imaging position are collected the data collection for one imaging cycle is complete and the photosensor array is repositioned to the first imaging position to prepare it for a subsequent imaging cycle. The displacement of the photosensor army described above provides the desired oversampling of image data signals to be applied to deblurring filter 180 so as to generate a non-aliased fine resolution data set which provides the desired spatial resolution. Alternative displacement patterns can be used in which the photosensor array is displaced in a different set of imaging positions so long as the same oversampling of each grid box of which it is desired to have a high resolution image, e.g., grid box 320₁, is accomplished by at least an equivalent number of photosensor pixels.

In particular, in at least one of the imaging positions in which image data signals are collected, the imaged grid box must be entirely within the boundaries of one photosensor pixel. Thus, assuming close to an ideal point spread function for the photosensor pixel army, the signal from one photosensor pixel in each exposure (i.e., at each respective imaging position) represents the sum of optical photons emanating from the grid box, or portions of different grid boxes, which the photosensor pixel overlaps. Thus, in FIG. 3(A) for example, the image data signal from photosensor pixel 310a corresponds to optical photons emanating from all of grid box 320₁, and from each additional grid box which adjoins grid box 320₁. Comparison of the respective areas of imaged object grid 320 covered by photosensor pixel 310a provides that ¼ of the optical photons generating the image data signal from pixel 310a pass from the central pixel (in this case, grid box 320₁); ⅛ from each of the grid boxes above, below, and to either side of the central pixel, and 1/16 from the grid boxes at each corner; these fractions normalize to sum to unity.

Data storage unit 175 is adapted such that image data signals from each respective photosensor pixel in each of the imaging positions during each imaging cycle is stored as a respective unfiltered interleaved data set. In accordance with this invention, each unfiltered interleaved data set is applied to deblurring filter 180, which is adapted to selectively filter the interleaved data set to generate a fine resolution data set that provides the desired spatial resolution. For example, in the embodiment of the invention described above, the fine resolution data set provides a limiting resolution of about 50 μm. Thus, display and analysis module must be capable of presenting data in a 2N×2M format (doubling the spatial resolution of photosensor pixel array 120). Data storage unit 175 typically comprises a computer RAM or hard drive or the like, and deblurring filter 180 typically comprises a reasonably fast computer adapted to perform Wiener filter functions.

One method of deblurring the unfiltered interleaved data can be described as follows. The limits of the summation are not specified at this point as not critical to the invention described herein. If f(m,n) describes the high resolution (e.g., 50 μm) data image and g(m,n) represents the values from the four interleaved data sets acquired with the lower resolution (e.g., 100 μm) imager, then these two arrays are related by the equation:

$$g(m,n) = \Sigma_{m',n'} h(m-m', n-n') f(m'n') \qquad \text{(Eqn 1-1)}$$

in which h(m,n) is the point spread function (also known as the impulse response) of the imaging system. Taking the (continuous) Fourier transform of equation 1-1, sampling theory provides that the transforms are related by the following equation:

$$G(W_x, W_y) = H(W_x, W_y) F(W_x, W_y) \quad (1\text{-}2)$$

in which the capital letters denote Fourier transforms. The magnitude of H(Wx,Wy), the Fourier transform of the point spread function, is the modulation transfer function of the imaging system. The mathematical manipulations discussed herein use well established mathematical functions, such as described in the book *Theory of Discrete and Continuous Fourier Analysis* by J. J. Weaver, (1989), and *An Introduction to Discrete Systems* by K. Steiglitz (1974), both of which are incorporated herein by reference.

In principle, one can obtain the high resolution image f(m,n) by solving equation 1-2 for $F(W_x, W_y)$ and taking the inverse transform. It is desired, however, to have a non-zero, non-aliased spatial response above the Nyquist frequency limit set by the imaging system (that is, the photosensor pixel array) pitch. Because the imaging system response goes to zero when the period of the modulation is equal to the width of the photosensitive area of a pixel, $H(W_x, W_y)$ goes to zero at a frequency slightly more than twice the Nyquist frequency. There is image noise at high spatial frequencies and the division of $G(W_x, W_y)$ by $H(W_x, W_y)$ would therefore amplify this noise to very large values. Consequently, $F(W_x, W_y)$ is approximated by the equation:

$$F(W_x, W_y) = \frac{G(W_x, W_y) H^*(W_x, W_y)}{|H(W_x, W_y)|^2 + a} \quad (\text{Eqn 1-3})$$

$$= G(W_x, W_y) K(W_x, W_y) \quad (\text{Eqn 1-4})$$

wherein:
$F(W_x, W_y)$ is the Fourier transform of the desired high resolution image;
$G(W_x, W_y)$ is the Fourier transform of the unfiltered image;
$H^*(W_x, W_y)$ is the conjugate of the Fourier transform of the point spread function of the imaging system;
$|H(W_x, W_y)|$ is the modulation transfer function of the imaging system;
a is a positive constant; and
$K(W_x, W_y)$ represents the Wiener filter spectrum.
The positive constant, a, is selected to reduce amplification of G at higher spatial frequencies so as to limit the high frequency noise.

Deblurring filter 180 can alternatively be adapted to apply an equivalent computational solution to generate the fine resolution image, namely the convolution obtained by taking the inverse transform of equation 1-3. This convolution is expressed as follows:

$$f(m,n) = \Sigma_{p,q} k(m-p, n-q) g(p,q) \quad (2\text{-}1)$$

in which k(m−p, n−q) represents the inverse Fourier transform of $K(W_x, W_y)$, the Wiener filter spectrum; and
g(p,q) represents the unfiltered image.
Applying the convolution to the unfiltered interleaved data set can typically be accomplished with fewer mathematical manipulations of the data since p and q might be limited to the range of ±3, for example.

Radiation imaging system 100 is adapted such that the output of the device is non-aliased. In particular, the imaging positions are selected such that both aliasing from the multiple exposures during a given imaging cycle is canceled, and thus the unfiltered data set and the filtered high resolution data set are non-aliased. Aliasing occurs when an imager is used to image a periodic input image having a period less than twice the pixel pitch. The multiple sampling procedure in accordance with this invention effectively provides the same spatial resolution as an imager with a smaller pitch so that spatial periods which would be aliased in only one data acquisition are not aliased when the output data are the result of more than one measurement.

The selection of imaging positions such that aliases are cancelled is more readily described in the context of a one-dimensional array rather than a two-dimensional array (as disclosed above in accordance with the present invention), and the principles are the same. Thus, for reasons of ease of explaining the present invention but not to limit the present invention, assume that the pixels in the hypothetical one dimensional imager are sensitive over only half of their width, that is the sensitive area is half the pitch. A first data acquisition occurs with the imager in one position and these values are recorded in memory. The imager is then moved by one half the pitch and a second data set is acquired. The two data sets are then interleaved (e.g., the first set becomes the "odd" numbered elements and the second set becomes the "even" numbered elements). The resulting composite data set is identical to that which would have been acquired with an imager having half the pitch and twice as many pixels. As a consequence, the effective Nyquist frequency is doubled and those spatial frequencies between the actual Nyquist frequency of the physical imager and twice the Nyquist frequency are no longer aliased.

In an imager that has pixels which are responsive over the entire area of the pixel (as is desirable for medical imagers), each of the two data sets described above covers the entire imaged area as each sampling (or exposure) covers the entire imaged object. The two samples thus overlap and the resulting composite image is "blurred," a condition which can be reduced by the filtering process described above. Even though each data set is blurred, two data sets acquired one half the pitch (of the physical photosensor array) apart still produce a composite data set having twice as many unique values as there are elements in the physical imager, an effective pitch which is one half the physical pitch, and an effective Nyquist frequency which is twice that of the physical imager. Consequently spatial frequencies between the physical imager's Nyquist frequency (e.g. 5 cycles per mm for a 100 micron pitch) and twice the Nyquist frequency (e.g. 10 cycles per ram), are no longer aliased in the composite data set. The same analysis can similarly be applied to a two dimensional imager. In accordance with this invention, a two dimensional imager is used to acquire 4 unique data sets from respective imaging positions such that the aliasing errors from the multiple sampling is cancelled.

The process of generating a high resolution image in accordance with this invention has been described above for the purpose of explanation and not limitation in the context of an imaging cycle in which four imaging positions are used to oversample the object to be imaged. The oversampling can be through use of K imaging positions and appropriately interleaving the unfiltered data in an unfiltered data set.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A radiation imaging system comprising:
a photosensor pixel array, said array comprising a plurality of pixels having a predetermined photosensor pixel pitch between adjoining pixels, each of said photosensor pixels being adapted to generate a respective image data signal, said array being adapted to be sequentially disposed in selected ones of a plurality of sequential imaging positions pursuant to a predetermined imaging cycle, each of said sequential imaging positions being selected such that the area imaged by each respective pixel overlaps a portion of the area imaged by said respective pixel while disposed in the preceding imaging position in said predetermined imaging cycle so as to oversample the imaged area; and
an image processor coupled to said photosensor pixel array so as to receive the respective image data signals generated by said photosensor pixels, said image processor being adapted to store said respective image data signals generated during an imaging cycle by said photosensor pixels in each of said respective sequential imaging positions as an unfiltered data set, said image processor further comprising a deblurring filter adapted to selectively filter said data set to generate a non-aliased fine resolution data set having spatial resolution greater than the imaging system Nyquist frequency determined by the pixel pitch of said photosensor array.

2. The imaging system of claim 1 wherein said plurality of sequential imaging positions comprises respective first, second, third, and fourth sequential imaging positions.

3. The imaging system of claim 2 wherein said first, second, third, and fourth imaging positions are disposed such that the distance between adjacent sequential imaging positions along a selected axis of movement of said photosensor pixel array is substantially one-half of said predetermined pitch of said pixels.

4. The imaging system of claim 3 wherein said first through fourth imaging positions are disposed so as to form the corners of a square with sides having a length of one-half said predetermined pitch of said pixels.

5. The imaging system of claim 2 wherein said photosensor pixel array comprises a plurality of pixels arranged in N rows and M columns.

6. The imaging system of claim 5 wherein said image processor is adapted to store in each unfiltered data set one image data signal generated by each respective photosensor pixel in each of said respective sequential imaging positions.

7. The imaging system of claim 6 wherein said deblurring filter is adapted such that said fine resolution data set generated by said filter resolves objects having spatial frequency components above the imaging system's Nyquist frequency.

8. The imaging system of claim 7 wherein said deblurring filter is adapted such that said fine resolution data set generated by said filter exhibits a spatial resolution capable of resolving objects of a size of one-half the predetermined photosensor pixel pitch.

9. The imaging system of claim 8 wherein said deblurring filter is adapted to form said fine resolution image in accordance with the equation:

$$F(W_x, W_y) = \frac{G(W_x, W_y)H^*(W_x, W_y)}{|H(W_x, W_y)|^2 + a}$$

wherein:
$F(W_x, W_y)$ is the Fourier transform of the desired high resolution image;
$G(W_x, W_y)$ is the Fourier transform of the unfiltered image;
$H^*(W_x, W_y)$ is the Fourier transform of the point spread function of the imaging system;
$|H(W_x, W_y)|$ is the modulation transfer function of the imaging system;
a represents a positive constant selected to reduce amplification of G at higher spatial frequencies so as to limit the high frequency noise.

10. The imaging system of claim 8 wherein said deblurring filter is adapted to form said fine resolution image in accordance with the convolution:

$$f(m,n) = \Sigma_{p,q} k(m-p, n-q) g(p,q)$$

in which $k(m-p, n-q)$ represents the inverse Fourier transform of K, the Wiener filter spectrum; and $g(p,q)$ represents the unfiltered image.

11. The imaging system of claim 5 further comprising a display and analysis module coupled to said image processor and adapted to receive the high resolution data set signals.

12. The imaging system of claim 11 wherein said display and analysis module comprises a display array having at least 2N by 2M display pixels, said display array having a pitch of about one-half said predetermined imaging pixel pitch.

13. The imaging system of claim 2 wherein said imaging system further comprises a displacement mechanism adapted to sequentially position said photosensor array at respective ones of said imaging positions in accordance with said predetermined imaging cycle.

14. The imaging system of claim 13 wherein said displacement mechanism comprises:
a displacement platform, a first drive cam coupled to said displacement platform such that motion of said drive cam is translated into movement of said displacement platform along a first selected axis, and a second drive cam coupled to said displacement platform such that motion of said drive cam is translated into movement of said displacement platform along a second selected axis.

15. The imaging system of claim 14 wherein each of said drive cams has a respective eccentric shape selected to cause displacement of said platform along the respective selected axis upon rotation of the respective cam.

16. The imaging system of claim 15 wherein said displacement mechanism is adapted such that each of said first and second axes are disposed so that selective movement of said displacement platform along said respective axes displaces said photosensor pixel army to a selected one of said imaging positions.

17. The imaging system of claim 16 wherein said predetermined pitch between photosensor pixels is about 100 microns.

18. The imaging system of claim 17 wherein said imaging system is adapted to detect and image incident x-rays.

19. A method of generating a high resolution image of incident radiation, comprising the steps of:

sequentially positioning an array of photosensor pixels in first through Kth imaging positions in accordance with a predetermined imaging cycle, said photosensor pixels being disposed in said array in rows and columns having a predetermined photosensor pixel pitch therebetween, each of said sequential imaging positions being selected such that the area imaged by each respective pixel overlaps a portion of the area imaged by said respective pixel while disposed in the preceding imaging position in said predetermined imaging cycle so as to oversample the imaged area:

storing the respective image data signals generated in each of the first through Kth imaging positions to form an unfiltered data set; and applying said unfiltered data set to a deblurring filter to form a high resolution data set having spatial resolution greater than the Nyquist frequency determined by the pixel pitch of said photosensor array;

said first through Kth imaging positions in said predetermined imaging cycle being disposed such that aliasing errors are cancelled in said high resolution data set.

20. The process of claim 19 wherein the step of sequentially positioning said array of photosensor pixels further comprises the steps of:

displacing said photosensor pixel array in a selected sequence so that said array is respectively disposed at each of four imaging positions during said imaging cycle.

21. The method of claim 20 wherein the step of displacing said array further comprises sequentially translating said array along a first axis and a second axis, said first and second axes being orthogonal.

22. The method of claim 21 wherein the distance along said first and second axes between respective ones of said four imaging positions correspond to one-half the photosensor pixel pitch.

23. The method of claim 22 wherein the step of applying said unfiltered data to a deblurring filter to form said high resolution data set comprises filtering said unfiltered data set to generate an image having a spatial resolution corresponding to one-half the photosensor pixel pitch.

24. The method of claim 23 wherein the step of applying said unfiltered data set to a deblurring filter further comprises computing said high resolution image data set in accordance with the following relationship:

$$F(W_x, W_y) = \frac{G(W_x, W_y)H^*(W_x, W_y)}{|H(W_x, W_y)|^2 + a}$$

wherein:

$F(W_x, W_y)$ is the Fourier transform of the desired high resolution image;

$G(W_x, W_y)$ is the Fourier transform of the unfiltered image;

$H^*(W_x, W_y)$ is the Fourier transform of the point spread function of the imaging system;

$|H(W_x, W_y)|$ is the modulation transfer function of the imaging system;

a represents a positive constant selected to reduce amplification of G at higher spatial frequencies so as to limit the high frequency noise.

25. The method of claim 23 wherein the step of applying said unfiltered data set to a deblurring filter further comprises computing said high resolution image data set in accordance with the following convolution:

$$f(m,n) = \Sigma_{p,q} k(m-p, n-q) g(p,q)$$

in which $k(m-p, n-q)$ represents the inverse Fourier transform of K, the Wiener filter spectrum; and $g(p,q)$ represents the unfiltered image.

26. The method of claim 25 further comprising the step of driving a display and analysis module to present said high resolution data.

27. A method for increasing the resolvable spatial frequency of a digital radiation imaging system having a plurality of imaging devices, the method comprising the steps of:

generating multiple exposures of an object to be imaged, each of said exposures being taken in a respective imaging position, each imaging position being disposed in a predetermined spatial relation with regard to the remaining imaging positions such that the area imaged in each respective imaging position overlaps a portion of the area imaged in the preceding imaging position;

registering the respective exposures generated in an unfiltered non-aliased data set; and deblurring said unfiltered data set to generate a non-aliased high resolution data set having spatial resolution greater than the Nyquist frequency determined by the pitch of said imaging devices.

28. The method of claim 27 wherein the step of generating multiple exposures further comprises the steps of selectively sequentially displacing an array of photosensor pixels to be disposed in respective ones of said imaging positions in accordance with an imaging cycle.

29. The method of claim 28 wherein the step of deblurring said image said data said further comprises the step of passing said data set through a deblurring filter, said deblurring filter comprising a Wiener filter.

30. The method of claim 29 wherein said imaging positions are selected to cancel aliasing errors in said high resolution data set.

31. An x-ray imaging system comprising:

a photosensor pixel array, said array comprising a plurality of pixels having a predetermined photosensor pixel pitch between adjoining pixels, each of said photosensor pixels being adapted to generate a respective image data signal, said array being adapted to be sequentially disposed in selected ones of a plurality of sequential imaging positions pursuant to a predetermined imaging cycle, each of said sequential imaging positions being selected such that the area imaged by each respective pixels overlaps a portion of the area imaged by said respective pixel while disposed in the preceding imaging position in said predetermined imaging cycle so as to oversample the imaged area; and an image processor coupled to said photosensor pixel array so as to receive the respective image data signals generated by said photosensor pixels, said image processor being adapted to store said respective image data signals generated during an imaging cycle by said photosensor pixels in each of said respective sequential imaging positions as an unfiltered data set, said image processor further comprising a deblurring filter adapted to selectively filter said data set to generate a non-aliased fine resolution data set having spatial resolution greater than the Nyquist frequency determined by the pixel pitch of said photosensor array; and a display and analysis module coupled to said image processor and adapted to be driven by said fine resolution data to generate an output fine resolution array, said output fine resolution array having a greater number of pixels than said photosensor pixel array, said imaging system being adapted such that each of the fine resolution pixels are driven by an individually-variable signal.

32. The imaging system of claim 31 wherein said plurality of sequential imaging positions comprises respective first, second, third, and fourth sequential imaging positions.

33. The imaging system of claim 32 wherein said first, second, third, and fourth imaging positions are disposed such that in each respective imaging position each photosensor pixel is centered on one of the respective areas representing a corresponding pixel element in the output fine resolution array, and further the four imaging positions are disposed such that each area representing a pixel element in said output high resolution array is centered on a respective photosensor pixel in only one of said four imaging positions.

34. The imaging system of claim 33 wherein the distance between adjacent sequential imaging positions along a selected axis of movement of said photosensor pixel array is substantially one-half of said predetermined pitch of said photosensor pixels.

35. The imaging system of claim 34 wherein said imaging system further comprises a displacement mechanism adapted to move said photosensor array so as to selectively dispose said photosensor array in a selected one of said imaging positions, said displacement mechanism comprising:

a displacement platform, a first drive cam coupled to said displacement platform such that motion of said drive cam is translated into movement of said displacement platform along a first selected axis, and a second drive cam coupled to said displacement platform such that motion of said drive cam is translated into movement of said displacement platform along a second selected axis.

36. The imaging system of claim 35 wherein each of said drive cams has a respective eccentric shape selected to cause displacement of said platform along the respective selected axis upon rotation of the respective cam.

37. The imaging system of claim 36 wherein said displacement mechanism is adapted such that each of said first and second axes are disposed so that selective movement of said displacement platform along said respective axes displaces said photosensor pixel array to a selected one of said imaging positions.

38. The imaging system of claim 37 further comprising a scintillator optically coupled to said photosensor pixel array and disposed to receive radiation passing from an object to be imaged.

39. The imaging system of claim 37 wherein said photosensor array comprises a radiation absorptive photosensitive material such that radiation incident on said imaging system is absorbed by said material and converted into mobile charge particles to generate said image data signals.

* * * * *